US011213881B2

(12) United States Patent
Priebe et al.

(10) Patent No.: US 11,213,881 B2
(45) Date of Patent: Jan. 4, 2022

(54) COMPONENT SYSTEM FOR PRODUCING CORES AND MOLDS

(71) Applicant: ASK Chemicals GmbH, Hilden (DE)

(72) Inventors: Christian Priebe, Wülfrath (DE); Jens Müller, Haan (DE); Heinz Deters, Düsseldorf (DE); Philip Schneider, Düsseldorf (DE); Frank Lenzen, Düsseldorf (DE); Markus Dörschel, Cologne (DE)

(73) Assignee: ASK CHEMICALS GMBH, Hilden (DE)

( * ) Notice: Subject to any disclaimer, the term of this patent is extended or adjusted under 35 U.S.C. 154(b) by 270 days.

(21) Appl. No.: 16/472,441

(22) PCT Filed: Dec. 22, 2017

(86) PCT No.: PCT/DE2017/101104
§ 371 (c)(1),
(2) Date: Jun. 21, 2019

(87) PCT Pub. No.: WO2018/113852
PCT Pub. Date: Jun. 28, 2018

(65) Prior Publication Data
US 2020/0316674 A1 Oct. 8, 2020

(30) Foreign Application Priority Data
Dec. 23, 2016 (DE) ..................... 10 2016 125 702.8

(51) Int. Cl.
| | | |
|---|---|---|
| B22C 1/22 | (2006.01) |
| B22C 1/16 | (2006.01) |
| B22C 9/12 | (2006.01) |
| C08G 18/54 | (2006.01) |
| C08G 18/76 | (2006.01) |
| C08K 5/5415 | (2006.01) |
| C08G 18/18 | (2006.01) |
| C08G 8/36 | (2006.01) |

(52) U.S. Cl.
CPC ............ B22C 1/2253 (2013.01); B22C 1/162 (2013.01); B22C 1/2273 (2013.01); B22C 9/12 (2013.01); C08G 18/18 (2013.01); C08G 18/542 (2013.01); C08G 18/7664 (2013.01); C08G 18/7671 (2013.01); C08K 5/5415 (2013.01); C08G 8/36 (2013.01)

(58) Field of Classification Search
CPC ..... B22C 1/2253; B22C 1/162; B22C 1/2273; B22C 9/12; C08G 18/542; C08G 18/7671; C08G 18/7664; C08G 18/18; C08G 8/36; C08K 5/5415
See application file for complete search history.

(56) References Cited

U.S. PATENT DOCUMENTS

| | | |
|---|---|---|
| 3,409,579 A | 11/1968 | Robins |
| 3,485,797 A | 12/1969 | Robins |
| 4,268,425 A | 5/1981 | Gardikes |
| 4,540,724 A | 9/1985 | Dunnavant et al. |
| 4,602,069 A | 7/1986 | Dunnavant et al. |
| 5,447,968 A | 9/1995 | Barnett et al. |
| 6,465,542 B1 | 10/2002 | Torbus et al. |
| 8,563,662 B2 | 10/2013 | Strunk et al. |
| 2017/0282239 A1 | 10/2017 | Lenzen |

FOREIGN PATENT DOCUMENTS

| | | |
|---|---|---|
| DE | 102004057671 B4 | 4/2007 |
| DE | 102006037288 A1 | 2/2008 |
| DE | 102015107016 A1 | 6/2016 |
| EP | 1137500 B1 | 3/2004 |

OTHER PUBLICATIONS

Machine English translation of DE 10 2006 037 288, Priebe et al., Feb. 14, 2008.*

* cited by examiner

*Primary Examiner* — Patrick D Niland
(74) *Attorney, Agent, or Firm* — Standley Law Group LLP

(57) ABSTRACT

The object of the invention is a component system for producing a binder for metal casting on the basis of phenolic resins of the benzyl ether type and isocyanates containing non-polar solvents.

27 Claims, No Drawings

COMPONENT SYSTEM FOR PRODUCING CORES AND MOLDS

INTRODUCTION

The present invention relates to a component system for producing a binder based on phenolic resins of the benzyl ether type, and isocyanate-containing nonpolar solvents for use in cold box methods for phenolic resin and polyurethane (PUCB methods), and/or no bake methods for phenolic resin and polyurethane (PUNB methods). Moreover, the invention relates to molding mixtures containing the binder and the mold base materials, and the use of the component system for metal casting.

BACKGROUND OF THE INVENTION AND PRIOR ART IN GENERAL

The production of cores and molds according to the PUCB process and/or according to the PUNB process has achieved great significance in the foundry industry. Here, two-component polyurethane systems are used to bond a refractory mold base material. The polyol component is comprised of a polyol with at least two OH groups per molecule, and the isocyanate component is comprised of an isocyanate with at least two NCO groups per molecule. Phenol formaldehyde resins are among the polyol components used. Curing the mixture of the mold base material and binder, also referred to as the mold material mixture for brevity, takes place in the PUCB process with the aid of low boiling point tertiary amines which are passed through the mold material mixture after molding in gaseous form or as an aerosol (cf. U.S. Pat. No. 3,409,579). Normally, this is done with the assistance of a carrier gas such as air, nitrogen or $CO_2$ into which at least one tertiary amine is dosed. In the PUNB process, liquid tertiary amines and/or metal compounds are added as the catalyst to the mold material mixture.

It is already routine practice to use aromatic hydrocarbon materials for binders in mold material mixtures to produce molds and cores for metal casting, and the use of nonpolar other solvents has already been proposed. Silicic acid esters and/or silicic acid derivatives assume an important role in this context.

EP 1057554 B1 describes the use of tetraalkyl silicates as a solvent in cold box binder systems. The more detailed description of the benzyl ether resin does not address etherified methylol groups, and only addresses alkyl phenols with an alkyl group of 1 to 8 carbon atoms. Advantageously, the amount of alkyl silicates, alkyl silicate oligomers or their mixtures lies within a range of 1 to 40% by weight in the phenolic resin component. Preferably, a co-solvent is added that in particular is a solvent that increases the polarity, such as dibasic esters, a mixture of $C_4$ to $C_6$ dicarboxylic acid methyl esters that is not specified in greater detail. The restriction of the concentration and the preference of a co-solvent are indications of an insufficient solubility at a higher concentration of alkyl silicates. This is illustrated by the examples in EP 1057554 B1, according to which these always have at least 5 parts by weight dibasic ester in the phenolic resin component. The $C_4$ to $C_6$ dicarboxylic acid used is not specified in greater detail.

WO 2009/130335 A2 describes benzyl ether resins that are re-esterified with an alkyl silicate with the aim of incorporating an inorganic polymer unit in the benzyl ether resin. In this case as well, it may be necessary to add a co-solvent when the molar masses are very high. From the examples, it is discernible that the resol resin according to the invention is fully soluble in tetraethyl silicate.

DE 102015201614 A1 describes another embodiment of the use of alkyl silicates in cold box binders consisting of a phenolic resol with free and/or etherified methylol groups (with a $C_1$ to $C_4$ alcohol), as well as an alkyl silicate and/or alkyl silicate oligomers and at least one compound from the group of dialkyl esters of $C_4$ to $C_6$ dicarboxylic acid esters. Dimethyl esters of $C_4$ to $C_6$ dicarboxylic acids are preferred. The $C_4$ to $C_6$ dicarboxylic acid used is not specified in greater detail. Non-etherified benzyl ether resins are preferred.

DE 102004057671 B4 describes benzyl ether resins whose methylol group(s) are etherified with a $C_1$ to $C_{10}$ alcohol, particularly preferably n-butyl. At the same time, the structural formula discloses the use of an alkyl phenol with an alkyl group of 1 to 10 C atoms. There are no references to solubility in pure tetraethyl silicate with the exception of experiment examples 2, 4, 5 and 9. It is notable that the amounts of etherified benzyl ether resin lie between 75 and 90% by weight.

EP 1 137 500 B1 describes etherified benzyl ether resins. To accomplish this, a $C_1$ to $C_8$ alcohol at 25 mole % is etherified with the hydroxy methane groups (—$CH_2$—OH). Alkyl phenols are not claimed separately and are mentioned in a general enumeration in the patent up to the $C_{26}$ chain. Nonpolar solvents are not mentioned in the claims and examples.

DE 102006037288 A1 describes PUCB binders that are modified with cardanol. The concentration of monomers is reduced by adding cardanol. Silicic acid esters and silicic acid oligomers are not mentioned as solvents.

OBJECT OF THE INVENTION

The object of the invention is to provide a phenolic resin of the benzyl ether type that is fully soluble in a nonpolar solvent and therefore homogeneously dissolves without or with only slight amounts of co-solvents. This is advantageous since co-solvents such as dicarboxylic acid esters can, as is known, lead to additional emissions during the casting process, for example by reacting to methacrylates.

SUMMARY OF THE INVENTION

The object can be solved by the subject matter of the independent claims. Advantageous developments are the subject matter of the dependent claims or are described below.

The subject of the invention is therefore the use of certain nonpolar solvents and possibly a co-solvent in a polyol component based on phenolic resins of the benzyl ether type. Other parts of the component system are an isocyanate component with isocyanates having at least two isocyanate groups per molecule.

The phenolic resins of the benzyl ether type have a phenol substituted with an aliphatic hydrocarbon group as a monomer component that is substituted on the aromate with an aliphatic hydrocarbon group having 11 to 26 carbon atoms, preferably 12 to 18 carbon atoms and 0 to 4 double bonds, preferably 0 to 3 double bonds, wherein the portion of the hydrocarbon group of the substituted phenol in the phenolic resin is 0.5 to 20% by weight. The hydrocarbon group is preferably located in the meta or para position, in particular in the meta position. The portion of the hydrocarbon-substituted phenolic group, in particular of cardanol and/or cardol in the phenolic resin of the benzyl ether type lies between 0.5 and 20% by weight, preferably 0.5 to 15% by weight, and especially preferably 2 to 12% by weight.

The polyol component contains a solvent that can dissolve phenolic resin of the benzyl ether type at room temperature. At least 95% by weight of the solvent is a nonpolar solvent, and the nonpolar solvent by definition stands for hydrocarbons, alkyl/alkoxy silanes, alkyl/alkoxy siloxanes, and their mixtures.

DETAILED DESCRIPTION OF THE INVENTION

The phenolic resin of the benzyl ether type has for example the following general structure, wherein the monomer units are statistically bonded:

The structural formula shown below only represents an example of the possible bond varieties. The exclusive o,o' bond shown in the example can in reality be any version, including o,p' or p,p'. The o,o' variant is however preferred (o=ortho, p=para).

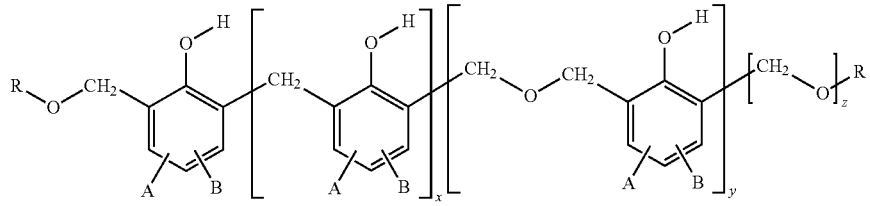

x=0-20, in particular 1 to 10
y=0-20, in particular 2 to 10
z=0-100, in particular 1 to 5, particularly preferably 1, with on average x+y+z>2,
R=—H; hydrocarbyl
and always independent of x and y
A=—H; hydrocarbyl; —O-hydrocarbyl; —OH and
B=—H; hydrocarbyl; —O-hydrocarbyl; —OH,
wherein A and/or B is hydrocarbyl for at least one A or at least one B.

To obtain phenolic resins of the benzyl ether type, preferably an at least equivalent number of moles of aldehyde compound is used with reference to the number of moles of the phenol compounds. Preferably, the molar ratio of the aldehydic compound to the phenolic compound is 1.05:1.0 to 2.5:1, particularly preferably 1.1:1 to 2.2:1, and especially preferably 1.2:1 to 2.0:1.

The production of the phenolic resin of the benzyl ether type takes place according to the method known to the specialist. In so doing, the phenol compound and the aldehyde compound are converted in the presence of a divalent metal ion at temperatures of preferably less than 130° C. The water formed is distilled off. In addition, a suitable entrainer can be added to the reaction mixture such as toluene or xylene, or the distillation is carried out at a reduced pressure.

Suitable catalysts for producing phenolic resins of the benzyl ether type are salts of divalent ions of metal such as Mn, Zn, Cd, Mg, Co, Ni, Fe, Pb, Ca and Ba, in particular Zn salts. Zinc acetate is preferably used. The amount used is not critical. Typical amounts of metal catalysts are 0.02 to 0.3% by weight, preferably 0.02 to 0.19% by weight relative to the overall amount of phenol compounds and aldehyde compound.

Such resins are for example described in U.S. Pat. No. 3,485,797 and in EP 1137500 B1, the disclosure of which is hereby expressly referenced both with respect to the phenolic resins of the benzyl ether type themselves, as well as to their production.

It was surprisingly found that, according to one embodiment, solubility of the phenolic resins of the benzyl ether type results when they contain a plurality of the following bonds in a statistical distribution in the polymerization chain:

a) R—CH$_2$—O—R$^1$
b) R—CH$_2$—R$^2$
c) R—CH$_2$—O—CH$_2$—R$^2$
d) R$^2$—CH$_2$—R$^2$
e) R$^2$—CH$_2$—O—CH$_2$—R$^2$
f) R$^2$—CH$_2$—O—R$^1$ on the other hand but preferably g) free of Si—O—Si and
h) free of C—O—Si bonds wherein R stands for a single bond (as an end group) or double bond (bonded on both sides of the chain) phenolic group that is at least bound by a methylene or a methylene ether group to another phenolic group.

R$^1$ stands for a saturated or unsaturated and/or straight-chain or branched carbon chain of C$_1$ to C$_{18}$, preferably C$_1$ to C$_{12}$, especially preferably C$_1$ to C$_9$ as the end group.

R$^2$ stands for a single bond or double bond substituted phenolic group that is free, or is bound by a methylene or methylene ether group to another phenolic ring that has one or two C$_{11}$ to C$_{26}$ carbon chains, in particular C$_{12}$ to C$_{18}$ carbon chains that are independent of each other and are located at the ortho and/or para and/or meta position (relative to the phenolic hydroxyl group) next to the phenolic hydroxyl group. The meta position is preferred. The carbon chains can be saturated or unsaturated, and/or branched or straight-chain independent of each other. The number of optionally containing double bonds per carbon chain is not limited and can be between 1 and 4. Cardanol, and/or cardol, and/or alkyl hydrated cardanol, and/or alkyl hydrated cardol, each having a fully saturated alkyl chain, is particularly preferred. In another embodiment, the cardanol and/or cardol which is possibly additionally unbound can be in the phenolic resin component without being incorporated in the benzyl ether resin structure. Moreover, one or two hydroxyl groups can also be added.

Preferably, up to 25 mole % of the —CH$_2$—OH groups is etherified in the phenolic resins of the benzyl ether type, in particular with C$_1$ to C$_{12}$, in particular C$_1$ to C$_4$ hydrocarbon groups.

The portion of hydrocarbon-substituted phenolic groups R$^2$, in particular of cardanol and/or cardol in the phenolic resins of the benzyl ether type lies between 0.5 and 20% by weight, preferably 0.5 to 15% by weight, and especially preferably 0.5 to 12% by weight. R$^2$ is typically cardanol or cardol.

Examples of suitable phenolic groups R are phenol, o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, p-nonylphenol, dinonylphenol, 3,5-dicyclohexylphenol, p-crotylphenol, p-phenylphenol, 3,5-dimethoxyphenol and p-phenoxyphenol.

Preferred multivalent phenolic residues/groups R have 2 to 4 phenolic hydroxyl groups. Special examples of suitable multivalent phenols are pyrocatechol, resorcinol, hydroquinone, pyrogallol, phloroglucinol, 2,5-dimethylresorcinol, 4,5-dimethylresorcinol, 5-methylresorcinol, or 5-ethylresorcinol. Mixtures consisting of different monovalent and polyvalent, and/or substituted, and/or condensed phenol components can also be used to produce the benzyl ether resin.

In addition to formaldehyde, additional aldehydes of the following formula are also suitable as further aldehydes for producing the phenol formaldehyde resin component:

wherein R is a carbon atom moiety with preferably 2 to 8, particularly preferably 1 to 3 carbon atoms. Special examples are acetaldehyde, propionaldehyde, furfuryl aldehyde and benzaldehyde. Particularly preferably, formaldehyde is used, either in its aqueous form, as para-formaldehyde or trioxide.

Compounds according to the invention used as nonpolar solvents have the following structure:

a) an alkyl/alkoxy silane (n=0) or an alkyl/alkoxy siloxane (n>1), in particular silicic acid ester and/or silicic acid ester oligomers

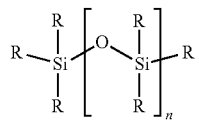

n=0-20
R=independent of n and of another R
$C_1$ to $C_6$ hydrocarbyl; —O-hydrocarbyl ($C_1$ to $C_6$)
and/or b) a hydrocarbon, in particular an alkyl/alkenyl benzene. Starting from benzene, alkyl and/or alkenyl groups are substituted on the aromatic ring independently of each other that have a chain length of $C_1$ to $C_{30}$, preferably from $C_1$ to $C_{20}$, and especially preferably from $C_1$ to $C_{16}$. Independent of each other, 1 to 6-ring hydrogens of the benzene can be substituted with an alkyl and/or alkenyl group; preferably 1 to 4, particularly preferably 1 to 3-ring hydrogens are substituted. Independent of this, the alkyl or alkenyl chain can be straight-chain or branched.

Mixtures of the nonpolar solvents among each other are also possible.

Suitable alkyl/alkoxy silanes or alkyl/alkoxy siloxanes are for example esters of orthosilicic acid in which 1, 2 or 3 alcohol groups are replaced with substituted or unsubstituted hydrocarbon groups, compounds of formula $R^1{}_nSi(OR)_{4-n}$, wherein n=1, 2 or 3, wherein each group R means an organic group independent of any other groups R, preferably branched or unbranched $C_1$ to $C_{30}$ alkyl or aryl, as correspondingly defined in conjunction with the first feature.

$R^1$ in this case is a substituted or unsubstituted, branched or unbranched hydrocarbon group, and the groups $R^1$ are equivalent or different when n=2 or 3. Preferably the groups $R^1$ are substituted or unsubstituted, branched or unbranched $C_1$ to $C_{30}$ alkyl or substituted or unsubstituted aryl, and particularly preferably substituted or unsubstituted, branched or unbranched $C_1$ to $C_6$ alkyl, or substituted or unsubstituted $C_6$ to $C_{10}$ aryl. Unsubstituted, branched or unbranched $C_1$ to $C_6$ alkyl or unsubstituted phenyl is most preferable. In this context, methyl, ethyl and propyl are also particularly preferred.

Preferably, modified esters are selected from the group consisting of tetraalkoxysilanes, monoalkyltrialkoxysilanes, dialkyldialkoxysilanes, trial-kylmonoalkoxysilanes, monoaryltrialkoxysilanes, diaryldialkoxysilanes and triarylmonoalkoxysilanes, wherein the alkyl or alkoxyl groups are preferably $C_1$ to $C_6$ alkyl groups. Modified esters are preferred that are selected from the group consisting of teraethoxylsilane, tetrapropoxysilane, methyltrimethoxysilane, methyltriethoxysilane, methyltripropoxysilane, methyltributoxysilane, ethyltrimethoxysilane, methyltriethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxipropyltrimethoxysilane, 3-glycidoxypropyltriethoxysilane, 3,4-epoxycyclohexyltrimethoxysilane, dimethoxydimethylsilane, diethoxydimethylsilane, diethyldimethoxysilane and diethyldiethoxysilane.

Particularly preferred are tetraethylorthosilicate, tetrapropylorthosilicate, their mixtures and their oligomers, or respectively mixtures of the oligomers. Especially preferred are tetraethylortho- and tetrapropylorthosilicate, or respectively their mixtures.

In another embodiment, it was found that the addition of a co-solvent to the phenolic resins of the benzyl ether type improves the solubility. It is therefore possible to formulate homogeneous solutions with a greater portion of silicic acid esters. An advantageous co-solvent is for example diesters of dicarboxylic acids.

Preferably, the phenolic resin of the benzyl ether type (benzyl ether resin plus solvent) contains less than 1.5% by weight water, particularly preferably less than 1.0% by weight and especially preferably less than 0.8% by weight water.

Preferably, the phenolic resin of the benzyl ether type (benzyl ether resin plus solvent) contains less than 2.0% by weight aliphatic alcohols, particularly preferably less than 1.5% by weight aliphatic alcohols, preferably less than 1.0% by weight aliphatic alcohols of $C_1$ to 018.

In a preferred embodiment, when a silicic acid ester and/or a silicic acid ester oligomer is used as the solvent, the phenolic resin of the benzyl ether type (benzyl ether resin plus solvent) contains less than 1.5% by weight aliphatic alcohol, particularly preferably less than 1.0% by weight and especially preferably less than 0.8% by weight aliphatic alcohol.

Preferably, the solvent is used in an amount, relative to the polyol component, of 10-70% by weight, particularly preferably 26-55% by weight, and especially preferably 41-50% by weight.

If a co-solvent according to the invention is used, preferably 0.5 to 9.6% by weight, particularly preferably 1 to 7.9% by weight and especially preferably 1 to 4.9% by weight relative to the polyol component is used.

The isocyanate component of the binder system comprises an aliphatic, cycloaliphatic or aromatic monomer or polymer isocyanate, preferably with on average 2 to 5 isocyanate groups per molecule. Depending on the desired properties, mixtures of isocyanates can also be used.

Suitable isocyanates comprise aliphatic isocyanates such as hexamethylene diisocyanate, alicyclic isocyanates such as 4,4'-dicyclohexylmethane diisocyanate and dimethyl derivatives therefrom. Examples of suitable aromatic isocyanates are toluene-2,4-diisocyanate, toluene-2,6-diisocyanate, 1,5-naphthalene diisocyanate, triphenylmethane triisocyanate, xylylene diisocyanate and methyl derivatives thereof, as well as polymethylene polyphenyl isocyanates. Preferred isocyanates are aromatic isocyanates, especially preferably polymethylene polyphenyl polyisocyanates such as technical 4,4'-diphenylmethane diisocyanate, i.e. 4,4'-diphenylmethane diisocyanate with a share of isomers and higher homologues.

The isocyanates can also be derivatized by reacting divalent isocyanates with each other such that a portion of their isocyanate groups is derivatized to form biuret, allophanate, uretdione or carbodiimide groups. For example, uretdione groups that have dimerization products, for example MDI or TDI, are of interest. Preferably however, such derivatized isocyanates are only used as a component in addition to the above non-derivatized isocyanates.

Preferably, the isocyanate is used in an amount such that the number of isocyanate groups is 80 to 120% with reference to the number of free hydroxyl groups of the resin.

The isocyanate component of the binder system is preferably used as a solution in an organic solvent, or a combination of organic solvents. Solvents can therefore be required, for example, in order to keep the components of the binder in a sufficiently low-viscous state. This is necessary, among other things, in order to obtain uniform cross-linking of the refractory mold material and maintain its free-flowing characteristics.

Either nonpolar solvents such as those cited according to the invention, or polar solvents, or mixtures thereof are used as the solvent as a part of the isocyanate component. The type of solvent is not limited pursuant to the invention.

In addition to the aforementioned components, the binder systems can contain additional additives such as silanes (for example according to EP 1137500 B1), internal parting agents such as fatty alcohols (for example according to U.S. Pat. No. 4,602,069), drying oils (for example according to U.S. Pat. No. 4,268,425), complexing agents (for example according to U.S. Pat. No. 5,447,968), flow improvers such as silicone surfactants, and additives to extend the processing time (for example according to U.S. Pat. No. 4,540,724), or mixtures thereof.

Moreover, the invention relates to mold material mixtures containing the binder based on phenolic resins of the benzyl ether type, refractory mold base material and isocyanates and possibly catalysts, and cores, molds and risers produced from the molding material mixtures after hardening. The use of the cores, molds and risers for metal casting, in particular iron and aluminum casting, is also the subject matter of the invention.

Conventional and known materials and their mixtures can be used as the refractory mold base material (hereinafter also referred to as mold base material for short) for producing the cast molds. Quartz sand, zirconium sand, chrome ore sand, olivine, vermiculite, bauxite, fireclay as well as so-called artificial mold base materials, i.e., mold base materials that are brought into a spherical, or approximately spherical (such as ellipsoidal) shape by industrial shaping processes. Examples of this are glass pearls, glassy granules or artificial, spherical ceramic sands—so-called Cerabeads® as well as Spherichrome®, SpherOX® or "Carboaccucast", as well as hollow microspheres that can be isolated among other things as a component of fly ash, such as aluminum silicate hollow spheres (microspheres). Mixtures of the cited refractory materials are also possible.

Mold base materials that contain more than 50% by weight quartz sand relative to the refractory mold base material are particularly preferable. A refractory mold base material is understood to be one which has a high melting point (melting temperature). Preferably, the melting point of the refractory mold base material is greater than 600° C., preferably greater than 900° C., particularly preferably greater than 1200° C., and especially preferably greater than 1500° C.

The refractory mold base material preferably comprises more than 80% by weight, in particular more than 90% by weight, particularly preferably more than 95% by weight of the mold material mixture.

The average diameter of the refractory mold base materials is generally between 100 μm and 600 μm, preferably between 120 μm and 550 μm, and particularly preferably between 150 μm and 500 μm. The particle size can be determined for example by passing through a sieve in accordance with DIN ISO 3310. Particle shapes with the greatest longitudinal extension to the smallest longitudinal extension (at a right angle to each other and for all spatial directions) of 1:1 to 1:5 or 1:1 to 1:3, i.e., those that are, for example, not fibrous, are particularly preferred.

The refractory mold base material is preferably in a free-flowing state, in particular in order to be able to process the mold material mixture according to the invention in conventional core shooters.

Suitable catalysts are tertiary amines. For the PUCB process, volatile tertiary amines are used, such as trimethyl amine ("TMA", CAS RN 75-50-3), dimethyl ethyl amine ("DMEA", CAS 75-64-9), dimethyl isopropyl amine ("DMIPA", CAS 996-35-0), dimethyl propyl amine ("DMPA", CAS RN 926-63-6) and triethyl amine ("TEA", CAS RN 121-44-8). Liquid tertiary amines are used for the PUNB process. This includes tertiary amines that are liquid at room temperature (25° C.) as well as those that become liquid after being heated to for example 40° C., or those that are dissolved in a suitable solvent. Examples are tris(3-dimethylamino)propylamine, isoquinoline, aryl pyridines such as phenyl pyridine, pyridine, acridine, 2-methoxypyridine, pyridazine, 3-chloropyridine, quinoline, N-methylimidazole, N-ethylimidazole, 4,4'-dipyridine, 4-phenylpropylpyridine, 1-methylbenzimidazole and 1,4-thiazine.

Moreover, the invention relates to a method for producing the mold material mixtures comprising:
(a) mixing refractory mold base materials with the binder according to the invention (at least phenolic resin of the benzyl ether type with solvent and isocyanate) in a binding amount of 0.2 to 15% by weight, preferably 0.3 to 14% by weight, particularly preferably 0.4 to 12% by weight, relative to the amount of the refractory mold base materials, and a catalyst that is added at the same time (in the PUNB process) or added separately later (in the PUCB process) for obtaining a mold material mixture,
(b) placing the mold material mixture obtained in step (a) in a molding tool;
(c) possibly adding the catalyst added separately later (PUCB), and hardening the mold material mixture in the molding tool using the catalyst according to the invention in order to obtain a core or a cast mold; and
(d) then separating the core or the cast mold from the tool, and hardening further if applicable.

To produce the mold material mixture, first the components of the binder system can be combined, and then added to the refractory mold base material. It is however also possible to add the components of the binder at the same time or one after the other in any sequence to the refractory mold base material.

In order to achieve an even mixing of the components of the mold material mixture, conventional methods can be used. The mold material mixture may also perhaps contain other conventional components such as iron oxide, ground flax fibers, sawdust granules, pitch and refractory metals.

According to the invention, curing can be accomplished according to the PUCB process, or according to the PUNB process. In the event of the PUCB process, for hardening, a low boiling tertiary amine in the form of a gas or as an aerosol is passed through the shaped mold material mixture by means of an inert carrier gas. The addition of a separate catalyst is omitted. All known cold box amine catalysts can be used. In the event of the PUNB process, the amine or metal catalyst can already be dissolved in the binder system or added as a separate component to the refractory material, wherein the added amount is approx. 0.1% by weight—approx. 5% by weight relative to the overall amount of binder in the refractory material.

The mold bodies produced according to this method can have any conventional shape employed in foundries. In a preferred embodiment, the mold bodies are in the form of foundry molds, cores or risers. These are distinguished by a very high mechanical stability.

Moreover, the invention relates to the use of this mold body for metal casting, in particular iron and aluminum casting.

The invention will be explained below in more detail with reference to preferred embodiments, or respectively experimental examples without being restricted to them.

EXPERIMENTAL EXAMPLES

Components Used
ISOCYANATE COMPONENT: homogeneous mixture of 80% Lupranat M 20 S and 20% Dynasylan A
CATALYST 706—dimethylpropylamine; supplied by ASK-Chemicals GmbH
Quartz sand H 32—supplied by Quarzwerke GmbH
Lupranat M 20 S: polymer diphenylmethane diisocyanate (MDI), functionality 2.6, supplied by BASF SE
DBE—dimethyl ester mixture of $C_4$-$C_6$ dicarboxylic acids, supplied by DuPont
Dynasilan A—Tetraethylorthosilicate monomer, supplied by Evonik Industries, free ethanol content <0.5%
Solvesso 100—solvent naphtha light, supplied by EXXON Mobile
GLYMO silane—(3-glycidoxypropyl)trimethoxysilane, supplied by Evonik Industries
Phenol 99%—supplied by Sigma Aldrich
Paraformaldehyde 91-93%, supplied by INEOS Paraform
Zinc acetate dihydrate—supplied by Sigma Aldrich
n-butanol—supplied by Sigma Aldrich
Palmer 1500-1, mixture of approximately 95% cardanol and approximately 5% cardol, supplied by Palmer International
All percentages are % by weight.
Benzyl Ether Resin Synthesis (Phenol Resin of the Benzyl Ether Type)

Benzyl Ether, Example 1 Produced According to EP 1057554 A 1

(Comparison)
1540 g phenol (99%) 704 g paraformaldehyde (91%) and 0.44 g zinc acetate dihydrate are added to a reaction vessel equipped with an agitator, reflux condenser and thermometer. While stirring, the temperature was evenly raised over 60 minutes to 105° C. and maintained until a refractive index (20° C.) of 1.550 was reached. Then the condenser was switched to atmospheric distillation, and the temperature was raised over an hour to 125 to 126° C. Distillation was continued at this temperature until a refractive index (20° C.) of 1.593 was reached. A vacuum was then applied, and distillation was continued at a reduced pressure up to a refractive index (20° C.) of 1.612. The yield was approx. 82%. The amount of free phenol determined with gas chromatography was 10.5% by weight, and the amount of saligenin (2-hydroxybenzyl alcohol) determined by gas chromatography was 8.4% by weight.

Benzyl Alcohol Ether Resin, Example 2

Produced According to Exemplary Embodiment 2, Resin A of DE 102004057671 B4
(Comparison)
234 g phenol (99%), 107 g paraformaldehyde (91%) and 0.295 g zinc acetate dihydrate were added to a reaction vessel equipped with an agitator, reflux condenser and thermometer. While stirring, the temperature was evenly increased over 90 minutes to 110° C. and held at 110° C. for 45 minutes. Distillation was then started, and the temperature was raised over 60 minutes to 126° C. Distillation was continued until a refractive index (20° C.) of 1.590 to 1.592 was reached. Distillation was then continued under a vacuum (<30 mbar) up to a refractive index (20° C.) of 1.613 to 1.615.

Subsequently, the temperature was reduced to 100° C., and 9 parts by weight n-butanol were added per 12 parts by weight of the obtained benzyl ether resin. Over 30 minutes, the benzyl ether resin composition was brought to the reflux temperature and maintained for 4 hours under reflux. The arising reaction water was continuously removed in a separator filled with n-butanol, wherein the low-water phase was fed back into the reaction mixture. The temperature rose from 119° C. up to 127° C. At 120° C., the excess n-butanol was distilled off in a vacuum (<30 mbar).

Benzyl Alcohol Ether Resin, Example 3 According to the Exemplary Embodiment 2 of DE 102006037288 A1

698.4 g phenol (99%), 302.6 g paraformaldehyde (91%) and 0.35 g zinc acetate dihydrate were added to a reaction vessel equipped with an agitator, reflux condenser and thermometer. While stirring, the temperature was evenly raised over 60 minutes to 105 to 115° C. and maintained until a refractive index (25° C.) of 1.5590 was reached. Then, 50 g of Palmer 1500-1 was added, and the condenser was switched to atmospheric distillation, and the temperature was raised over an hour to 124 to 126° C. Distillation was continued at this temperature until a refractive index (25° C.) of 1.5940 was reached. A vacuum was then applied, and distillation was continued at a reduced pressure up to a refractive index (25° C.) of about 1.600. The amount of free phenol determined with gas chromatography was 12.5% by weight, and the amount of saligenin was 9.5% by weight.

Benzyl Ether Resin, Example 4

698.4 g phenol (99%), 302.6 g paraformaldehyde (91%) and 0.35 g zinc acetate dihydrate were added to a reaction vessel equipped with an agitator, reflux condenser and thermometer. While stirring, the temperature was evenly raised over 60 minutes to 105 to 115° C. and maintained until a refractive index (25° C.) of 1.5590 was reached. Then, 50 g of Palmer 1500-1 was added, the condenser was switched to atmospheric distillation, and the temperature was raised over an hour to 124 to 126° C. Distillation was continued at this temperature until a refractive index (25° C.) of 1.5940 was reached. A vacuum was then applied, and distillation was continued at a reduced pressure up to a refractive index (25° C.) of about 1.600. Then 10 parts per weight n-butanol was added per 90 parts per weight of the obtained resin, and a temperature of 122 to 124° C. was maintained for 60 minutes under reflux. Then the unreacted butanol was removed under a vacuum. The resin had a refractive index (25°) of about 1.5970. The amount of free phenol determined with gas chromatography was 10.3% by weight, and the amount of saligenin was 8.2% by weight.

Measurement of Viscosity

The viscosity was determined using a Brookfield rotation viscosimeter with the "small sample" method, spindle No. 21 at 100 RPM and 25° C.

Measurement of the Phenol and Saligenin Content

The phenol and saligenin content was determined by means of gas chromatography as described below:
Description of the method:
Calibration: Internal standard method, 7-point calibration per
    substance to be determined
Internal standard: 2,4,6-trimethylphenol p.A.
Standard substances: Phenol p.A. and saligenin (o-hydroxybenzyl alcohol) p.A.
Gas chromatograph: Agilent 7890 Plus, with FID, capillary column, autosampler and Agilent ChemStation
Device parameters:
Inlet system: Split/splitless injector, split 50:1 (79.9 ml/min) after
    2 minutes, runtime 20 ml/min
    Temperature: 280° C.
Carrier gas: Hydrogen 5.0, flow 1 ml/min, constant flow method
Capillary column: HP-5MS, HP 19091S-105, length 50 m, diameter 0.2 mm, film 0.33 µm
Temperature program: 60° C. to 1.5 min; 4.0° C./min to 140° C., hold for zero minutes, then 20° C./min up to 325° C., hold for 6 minutes at 325° C.
Detector: FID, temperature: 320° C.
    Combustible gas: Hydrogen 5.0 with 20 ml/min, synthetic air 5.0 with 350 ml/min, makeup gas: Nitrogen 5.0 with 25 ml/min
Autosampler: 10 µl GC syringe, 1 µL dosed, fast injection mode
Quantification: Agilent Chemstation, standard setting,
    internal standard method, results indicated in
    percent by weight Determining Stability Under Cold For 24 hours, the solutions (A1 to B9) were frozen at −18° C.; after reaching room temperature again, the homogeneity was visually checked without stirring or shaking the sample containers.

Empirical Parameters of the Solvent Polarity $E_T(30)$ Values

Using the negatively solvatochromic pyridinium-N-phenolate betaine dye $E_T(30)$, the polarity of the solvent mixtures was determined by measuring the longest wave VIS/NIR absorption band (at 25° C. and 1 bar). Here, high $E_T(30)$ values correspond to a high solvent polarity. The values can be found in the following articles:
C. Reichardt, Chem. Rev. 1994, 94, 2319-2358.
C. Reichardt, G. Schafer, Liebigs Ann. 1995, 1579-1582.
R. Eberhardt, S. Löbbecke, B. Neidhart, C. Reichardt, Liebigs Ann./Recueil 1997, 1195-1199.
C. Reichardt, Green Chem. 2005, 7, 339-351.
V. G. Machado, R. I. Stock, C. Reichardt, Chem. Rev. 2014, 114, 10429-10475.

Determining Solubility

Directly after reaching the end value (termination criterion) for benzyl ether resin synthesis (examples 1 to 4), the hot benzyl ether resin was added to the room-temperature-measuring solvents or solvent mixtures of the substances in Tables 1 and 2 under the addition of mechanical energy (stirring and/or shaking). After the mixture was free of air, the solubility was evaluated.

Determining Strength in $N/Cm^2$

A sand mixture consisting of quartz sand H 32 plus 0.60% of the aforementioned binder compositions (individually in examples A1 to B6) and 0.60% ISOCYANATE COMPONENT was mixed homogeneously in a Hobart mixer for 2 minutes. This sand mixture was transferred to a Roeper H 1 core shooter and two cores with dimensions (l×w×h) of 220 mm×22.4 mm×22.4 mm were each shot with a 4 bar shooting pressure into the mold by compressed air. The sand was hardened with a CATALYST 706 (0.5 ml, 10 second gassing time at a 2 bar flushing pressure). After hardening, the core was removed and the strength was determined using a Multiserw bending device after 15 seconds, 30 seconds, 24 hour storage at room temperature, and 24 hour storage at room temperature in a closed room with 98% relative humidity (24 h 98% RH).

|  | A1 | A2 | A3 | A4 | A6 | A7 |
|---|---|---|---|---|---|---|
| Benzyl ether resin according to example 1 | 53 |  | 53 |  | 53 | 53 |
| Benzyl ether resin according to example 2 |  | 53 |  | 53 |  |  |
| Dynasylan A | 46 | 46 | 38 | 38 | 45 | 37 |
| DBE |  | 8 |  | 8 |  | 8 |
| Phenol |  |  |  |  | 1 | 1 |
| Glymo silane | 1 | 1 | 1 | 1 | 1 | 1 |
| Palmer 1500-1 |  |  |  |  |  |  |
| Solubility | no | yes | yes | yes | no | yes |
| Viscosity mPas (25° C.) | n.m. | 12 | 134 | 10 | n.m. | 112 |
| Stability in cold −18° C. | n.m. | yes | no | yes | n.m. | yes |

Results in percent by weight if not otherwise indicated.
n.m. = not measurable

Table 1 shows the benzyl ether resin mixtures used as a comparison, and their solubilities.

|  | B1 | B2 | B3 | B4 | B5 | B6 |
|---|---|---|---|---|---|---|
| Benzyl ether resin according to example 1 |  |  |  |  |  |  |
| Benzyl ether resin according to example 3 | 53 |  | 53 |  | 53 |  |
| Benzyl ether resin according to example 4 |  | 53 |  | 53 |  | 53 |
| Dynasylan A | 46 | 46 | 38 | 38 | 36 | 36 |
| DBE |  | 8 |  | 8 | 8 | 8 |
| Glymo silane | 1 | 1 | 1 | 1 | 1 | 1 |
| Palmer 1500-1 |  |  |  |  | 2 | 2 |
| Solubility | yes | yes | yes | yes | yes | yes |
| Viscosity mPas (25° C.) | 76 | 67 | 68 | 63 | 77 | 70 |
| Stability in cold −18° C. | yes | yes | yes | yes | yes | yes |

Results in percent by weight if not otherwise indicated.
Table 2 shows the benzyl ether resin mixtures according to the invention and their solubilities.

|  | Comparison | According to the invention | |
|---|---|---|---|
|  | A5 | B7 | B8 |
| Benzyl ether resin according to example 1 | 53 | | |
| Benzyl ether resin according to example 3 | | 53 | |
| Benzyl ether resin according to example 4 | | | 53 |
| Solvesso 100 | 46 | 46 | 46 |
| Glymo silane | 1 | 1 | 1 |
| Solubility | no | yes | yes |
| Viscosity mPas (25° C.) | n.m. | 76 | 65 |

Table 3 shows the benzyl ether resin mixtures according to the invention and their solubilities.

|  | A1 | A2 | A3 | A4 |
|---|---|---|---|---|
| Immediately 15 sec | n.m. | 62 | 175 | 55 |
| Immediately 30 sec | n.m. | 78 | 175 | 70 |
| 24 h | n.m. | 306 | 230 | 321 |
| 24 h 98% RH | n.m. | 169 | 98 | 178 | n.m. = not measurable

Table 4 shows the comparative strengths

|  | B1 | B2 | B3 | B4 | B5 | B6 |
|---|---|---|---|---|---|---|
| immediately 15 sec | 119 | 165 | 188 | 162 | 180 | 160 |
| immediately 30 sec | 127 | 172 | 193 | 174 | 182 | 165 |
| 24 h | 243 | 291 | 302 | 278 | 289 | 265 |
| 24 h 98% RH | 95 | 112 | 108 | 107 | 127 | 129 |

Table 5 shows the strengths of the mold material mixtures according to the invention.

From the results tables, it can be seen that the benzyl ether resins leading to the benzyl ether resin mixtures B1-B6 according to the invention in examples 3 and 4 fully dissolve in tetraethyl orthosilicate and Solvesso 100. This is also illustrated in other examples by the low viscosity and improved stability under cold. If the viscosity is considered with an equivalent amount of residual phenol (since phenol also reduces the viscosity; examples A1, A6, B1; and A3, A7, B3), resin solutions with a lower viscosity are also obtained with the resins according to the benzyl ether resins from examples 3 and 4.

Benzyl ether resin 2 also manifests a favorable solubility in nonpolar solvents, but however the immediate strengths are unsatisfactory.

If examples B3 to B5 and B4 to B6 are considered, it is found that adding cardanol/cardol improves the moisture resistance of the binders and helps improve the plasticity of the sand cores.

The invention claimed is:

1. A component system for hardening mold material mixtures, the system comprising the following components, which are spatially separate from each other:
a polyol component, comprising a phenolic resin having benzylic ether linkages and a solvent, wherein the phenolic resin having benzylic ether linkages is dissolved in the solvent, with at least 95% by weight of the solvent being a non-polar solvent selected from the group consisting of:
hydrocarbons, alkyl/alkoxy silanes, alkyl/alkoxy siloxanes and mixtures thereof; and
an isocyanate component comprising one or more isocyanate compounds having at least 2 isocyanate groups per molecule;
wherein the phenolic resin having benzylic ether linkages has at least one phenol as a monomer component that is substituted with an aliphatic hydrocarbon group and is substituted on the aromatic ring thereof with an aliphatic hydrocarbon group having 11 to 26 hydrocarbon atoms and 0 to 4 double bonds, and the portion of the hydrocarbon group-substituted phenol in the phenolic resin is 0.5 to 20% by weight; and
wherein the phenolic resin having benzylic ether linkages contains less than 2.5% by weight free phenol.

2. The component system according to claim 1, wherein up to 25 mole % of the -CH2-OH groups of the phenolic resin having benzylic ether linkages is etherified with $C_1$ to $C_{12}$ hydrocarbon groups.

3. The component system according to claim 1, wherein the solvent is used in an amount, relative to the polyol component, of 10 to 70% by weight.

4. The component system according to claim 1, wherein the polyol component also contains free saligenin at a weight ratio of free phenol to free saligenin of 1 to greater than 1.

5. The component system according to claim 1, wherein the nonpolar solvent is an alkyl benzene.

6. The component system according to claim 1, wherein the nonpolar solvent is a $C_6$ to $C_{22}$ alkane.

7. The component system according to claim 1, wherein the alkyl/alkoxy silane is a tetraethylorthosilicate or a tetrapropylorthosilicate, their oligomers as well as their mixture.

8. The component system according to claim 1, wherein the nonpolar solvent has an $E_T(30)$ value of less than 35.

9. The component system according to claim 1, wherein the solvent contains a diester of a dicarboxylic acid as a co-solvent.

10. The component system according to claim 1, wherein the phenolic resin having benzylic ether linkages contains phenol and cresol as monomer components, wherein the molar share of the cresol incorporated in the phenolic resin is less than or equal to that of the phenol incorporated in the phenolic resin.

11. The component system according to claim 1, wherein the polyol component contains less than 1.5% by weight water.

12. The component system according to claim 1, wherein the polyol component is characterized by at least one of the following features:
aliphatic alcohols are present at less than 2% by weight; and
if alkyl/alkoxy silanes, alkyl/alkoxy siloxanes or their mixtures are used, aliphatic alcohols are present at less than 1.5% by weight.

13. The component system according to claim 1, wherein the phenolic resin has an average molecular weight (Mw), measured according to DIN 5567-1, of 600 to 1200 g/mol, in particular from 600 to 1,000 g/mol.

14. The component system according to claim 1, further comprising, as another component that is spatially separate, a refractory mold base material.

15. The component system according to claim 1, wherein the phenol substituted with an aliphatic hydrocarbon group is further characterized as a monomer component by one or more of the following features:
a) the aliphatic hydrocarbon group has 0 to 3 double bonds;

b) the phenol substituted with an aliphatic hydrocarbon group is incorporated as a monomer by 0.5 to 15% by weight in the phenolic resin having benzylic ether linkages;
c) the aliphatic hydrocarbon group is bound at the meta or para position, of the phenol monomer component; and
d) the phenol substituted with an aliphatic hydrocarbon group is cardol and/or cardanol.

16. A molding material mixture produced by combining the polyol component and the isocyanate component according to claim 1, and a refractory mold base material.

17. A method for producing molds, cores or risers by combining the polyol component and the isocyanate component according to claim 1, and a refractory mold base material, and hardening according to the PU no-bake and PU cold box method.

18. The component system according to claim 1, wherein the polyol component also contains free saligenin, wherein the weight of the free saligenin exceeds the weight of the free phenol.

19. The component system according to claim 1, wherein up to 25 mole % of the —CH2—OH groups of the phenolic resin having benzylic ether linkages is etherified with $C_1$ to $C_4$ hydrocarbon groups.

20. The component system according to claim 1, wherein the solvent is used in an amount, relative to the polyol component, of 41 to 50% by weight.

21. The component system of claim 5, wherein the nonpolar solvent is an alkyl benzene with 7 to 13 carbon atoms.

22. The component system according to claim 5, wherein the nonpolar solvent is at least one of trimethylbenzene and propylbenzene.

23. The component system according to claim 9, wherein the diester of a dicarboxylic acid is a branched dicarboxylic acid.

24. The component system according to claim 1, wherein the polyol component contains less than 0.8% by weight water.

25. The component system according to claim 1, wherein the polyol component is characterized by at least one of the following features:
   aliphatic alcohols are present at less than 1.0% by weight; and
   if alkyl/alkoxy silanes, alkyl/alkoxy siloxanes or their mixtures are used, aliphatic alcohols are present at less than 0.8% by weight.

26. The component system according to claim 1, wherein the phenolic resin has an average molecular weight (Mw), measured according to DIN 5567-1, of 600 to 1,000 g/mol.

27. The component system according to claim 1, wherein the phenolic resin having benzylic ether linkages contains less than 2% by weight free phenol.

* * * * *